(12) United States Patent
Pittaluga et al.

(10) Patent No.: US 11,451,307 B1
(45) Date of Patent: Sep. 20, 2022

(54) OPTICAL SYSTEM AND METHOD

(71) Applicant: Kabushiki Kaisha Toshiba, Tokyo (JP)

(72) Inventors: Mirko Pittaluga, Cambridge (GB);
Zhiliang Yuan, Cambridge (GB);
Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/403,783

(22) Filed: Aug. 16, 2021

(30) Foreign Application Priority Data

Mar. 30, 2021 (GB) .................................. 2104518

(51) Int. Cl.
*H04B 10/70* (2013.01)
*H04B 10/61* (2013.01)
*H04B 10/50* (2013.01)
*H04B 10/29* (2013.01)

(52) U.S. Cl.
CPC ............. *H04B 10/70* (2013.01); *H04B 10/29* (2013.01); *H04B 10/50* (2013.01); *H04B 10/61* (2013.01)

(58) Field of Classification Search
CPC ......... H04B 10/70; H04B 10/50; H04B 10/61
USPC ........................................................ 398/158
See application file for complete search history.

(56) References Cited

U.S. PATENT DOCUMENTS

| 11,223,419 B1* | 1/2022 | Pittaluga | H04B 10/70 |
| 2007/0064945 A1* | 3/2007 | Yuan | H04B 10/70 380/263 |
| 2009/0103576 A1* | 4/2009 | Achtenhagen | H01S 3/2308 372/22 |
| 2009/0180776 A1* | 7/2009 | Brodsky | H04W 12/04 380/278 |
| 2010/0027794 A1* | 2/2010 | Yuan | H04L 63/1466 380/278 |
| 2011/0170695 A1 | 7/2011 | Fujiwara et al. | |
| 2011/0255150 A1* | 10/2011 | Nguyen | G02F 1/39 359/330 |
| 2012/0328290 A1* | 12/2012 | Yuan | H04L 9/0855 398/154 |
| 2013/0251369 A1 | 9/2013 | Ogasahara | |

(Continued)

FOREIGN PATENT DOCUMENTS

CN 111314071 A 6/2020

OTHER PUBLICATIONS

Shimada et al; Measurement of the optical path length difference in an interferometer using a sinusoidally frequency-modulated light source; Apr. 2016; Applied optics; pp. 1-5. (Year: 2016).*

(Continued)

*Primary Examiner* — Amritbir K Sandhu
(74) *Attorney, Agent, or Firm* — Oblon, McClelland, Maier & Neustadt, L.L.P.

(57) ABSTRACT

An optical system, comprising:
an emitter configured to output a first optical signal along a first optical path to an interference unit and to output a second optical signal along a second optical path to the interference unit, the interference unit being configured to interfere the first and second optical signals,
wherein the coherence length of the optical signal is longer than the path difference between first and second optical paths, and there is a path difference between the first and second paths of at least 1 km.

18 Claims, 5 Drawing Sheets

(56) References Cited

U.S. PATENT DOCUMENTS

| | | | | |
|---|---|---|---|---|
| 2015/0372768 | A1* | 12/2015 | Dynes | H04B 10/70 |
| | | | | 398/188 |
| 2017/0222731 | A1* | 8/2017 | Lucamarini | H04B 10/70 |
| 2018/0062838 | A1* | 3/2018 | Godfrey | H04L 9/0858 |
| 2018/0241553 | A1* | 8/2018 | Lucamarini | H04B 10/70 |
| 2019/0190706 | A1* | 6/2019 | Stack | H04L 9/0852 |
| 2019/0393675 | A1* | 12/2019 | Marangon | H01S 5/06216 |
| 2020/0274701 | A1* | 8/2020 | Yuan | H04L 9/0841 |
| 2021/0063136 | A1* | 3/2021 | Islam | G01B 9/02007 |
| 2021/0399810 | A1* | 12/2021 | Li | H04B 10/2507 |

OTHER PUBLICATIONS

Shimada et al; Measurement of the optical path length difference in an interferometer using a sinusoidally frequency-modulated light source; Apr. 2016; Applied optics vol. 55, No. 11; pp. 1-5. (Year: 2016).*

Minder et al; Measurement of the optical path length difference in an interferometer using a sinusoidally frequency-modulated light source; May 2019; Nature photonics; pp. 1-7. (Year: 2019).*

Minder et al.; Experimental quantum key distribution beyond the repeaterless secret key capacity; May 2019; Nature Photonics; pp. 1-7. (Year: 2019).*

Tratnik et al., "Fiber interferometric communications using MACH-zehnder interferometer topology," IEEE EUROCON 2009, May 18, 2009, pp. 1729-1734 (7 total pages).

Chen et al., "Twin-Field Quantum Key Distribution over 511 km Optical Fiber Linking two Distant Metropolitans," arXiv:2102.00433v1 [quant-ph], Jan. 31, 2021, downloaded from https://arxiv.org/pdf/2102.00433.pdf on Aug. 3, 2021, 32 pages.

Wang et al., "Simple method for asymmetric twin-field quantum key distribution", New J. Phys., vol. 22, Jan. 20, 2020, 16 pages.

Combined Great Britain Office Action and Search Report dated Jun. 25, 2021 in Great Britain Patent Application No. 2020609.0, 6 pages.

Combined Great Britain Office Action and Search Report dated Aug. 5, 2021 in Great Britain Patent Application No. 2104518.2, 6 pages.

Hua-Lei Yin, et al., "Measurement-Device-Independent Quantum Key Distribution Over a 404 km Optical Fiber", Physical Review Letters 117, 2016, 5 pages.

Mirko Pittaluga, et al., "600 km repeater-like quantum communications with dual-band stabilisation", Dec. 30, 2020, arXiv:2012.15099v1, 14 pages.

Hoi-Kwong Lo, et al., "Measurement-Device-Independent Quantum Key Distribution", Physical Review Letters 108 (13), Mar. 30, 2012, 5 pages.

A Rubenok, et al., "Real-World Two-Photon Interference and Proof-of-Principle Quantum Key Distribution Immune to Detector Attacks", Physical Review Letters 111 (13), 2013, 5 pages.

Yang Liu, et al., "Experimental Measurement-Device-Independent Quantum Key Distribution", Physical Review Letters 111 (13), 2013, 5 pages.

L.C. Comandar, et al., "Quantum key distribution without detector vulnerabilities using optically seeded lasers", Nature Photonics 10 (5), 2016, 5 pages.

Yang Liu, et al., "Experimental Twin-Field Quantum Key Distribution through Sending or Not Sending", Physical Review Letters 123 (10) 2019, 6 pages.

Jiu-Peng Chen, et al., "Sending-or-Not-Sending with Independent Lasers: Secure Twin-Field Quantum Key Distribution over 509 km", Physical Review Letters 124 (7), 2020, 5 pages.

M. Pittaluga, et al., "A New Approach to extend QKD", 2020, 1 page.

Charles H. Bennett, et al., "Quantum Cryptography: Public Key Distribution and Coin Tossing", Proc. of IEEE International Conference on Computer Systems Signal Processing, 1984, 7 pages.

* cited by examiner

OPTICAL SYSTEM AND METHOD

CROSS REFERENCE TO RELATED APPLICATION

This application is based upon and claims the benefit of priority from prior United Kingdom Application number 2104518.2 filed on Mar. 30, 2021, the entire contents of which are incorporated herein by reference.

FIELD

Embodiments relate generally to an optical system and method.

BACKGROUND

In optical systems, information may be stored in the phase of an optical signal. Such an optical signal is transmitted between distant nodes using an optical channel. The optical channel may introduce phase drift, which contributes to phase noise.

In a quantum communication system, information is sent between a transmitter and a receiver by encoded single quanta, such as single photons. A bit of information can be encoded upon a property of the photon, such as its polarization, phase, time or energy.

Quantum key distribution (QKD) is a technique that results in the sharing of cryptographic keys between two parties: a transmitter often referred to as "Alice"; and a receiver often referred to as "Bob". The attraction of this technique is that it allows to quantify the maximum information potentially known to an unauthorised eavesdropper, often referred to as "Eve". In many forms of QKD, Alice and Bob use two or more non-orthogonal bases in which to encode the bit values. These bases are kept secret during the quantum communication and are disclosed in a public discussion only after all the measurements have been completed by Bob. The laws of quantum mechanics dictate that measurement of the photons by Eve without prior knowledge of the encoding basis causes an unavoidable change to the quantum state of some of the photons. This will cause errors in the bit values sent between Alice and Bob. By comparing a part of their common bit string, Alice and Bob can thus determine the potential information gained by Eve. Some QKD methods require an accurate measurement of the phase of the photon received at the detector.

DETAILED DESCRIPTION

In an embodiment, an optical system is provided that comprises:
an emitter configured to output a first optical signal along a first optical path to an interference unit and to output a second optical signal along a second optical path to the interference unit, the interference unit being configured to interfere the first and second optical signals, wherein the coherence length of the optical signal is longer than the path difference between first and second optical paths, and there is a path difference between the first and second paths of at least 1 km.

Optical systems that rely on communicating information by the interference of two optical signals are becoming more ubiquitous due to their applications in quantum communication and particularly quantum key distribution (QKD). One type of system that can be used in QKD allows communication between two communication nodes using a relay or detector node. The two communication nodes send optical pulses which are encoded in phase to the relay node and from the result of the interference measured by the relay node, a key can be shared between the two communication nodes. However, to be able to determine information about the phase used to encode the pulses from an interference measurement, typically such systems have a symmetrical layout. This provides certain design restrictions on the system in terms of the location of the position of the emitter of optical signals in the system. However, the above system, uses an emitter having a very long coherence length of greater than 1 km. This allows a high degree of asymmetry in the system.

In a further embodiment, the difference between the first path and the second path is at least 10 km or at least 50 km or at least 100 km.

As noted above, the system may comprise a first node and a second node, wherein the first node forms at least part of the first optical path and the second node forms at least part of the second optical path. The longer coherence length laser allows the emitter to be provided in one of the communication nodes, for example, the emitter may be located in the first node such that the second optical path extends from the emitter in the first node, through the second node and to the inference unit.

The first node and the second node may be linked by a standard optical fibre or may be linked by a frequency stabilising fibre which prevents phase drift of the signal when passing through the fibre.

As noted above, the optical system may be a quantum communication system comprising a first encoder is located in the first node and a second encoder located in the second node, the first encoder being configured to receive said first optical signal, encode said signal in phase such that the first optical signal output from said first encoder is encoded in phase, the second encoder being configured to receive said second optical signal, encode said second optical signal in phase such that the second optical signal output from said second encoder is encoded in phase, wherein said interference unit is configured to interfere the encoded first optical signal and the encoded second optical signal.

As noted above, due to the large coherence length and the asymmetry that this allows, the emitter does not need to be provided in the same node as the interference unit. Possible lasers that can provide the required long coherence lengths are lasers with a narrow emission linewidth, that can for example be obtained by locking a laser to a high finesse optical cavity. Examples of this type of laser sources are the Stable Laser Systems SLS-INT-1550-200-1, or the Menlo Systems ORS-Cubic Ultrastable Laser.

The emitter referred to above can be an emitter which is used to emit signals which will be processed to form "quantum signals". Such quantum signals are pulsed signals which are attenuated to the order of a single photon or less, such that interception of the signal to read the signal by an unauthorised eavesdropper would result in the signal being destroyed. The eavesdropper could recreate the signal, but since the eavesdropper is unable to measure the phase with 100% accuracy, their recreation of the signal would increase the error rate to detectable levels.

The emitter can be a continuous wave "CW" emitter or it can emit a pulsed signal. If the emitter is a CW emitter, the CW signal will be processed into pulses either prior to encoding or during encoding. In an embodiment, each pulse is configured to contain on average one photon or less.

In an embodiment, when the system is configured as a quantum communication system, the interference unit is located in a detector node, said detector node comprises processing circuitry, said processing circuitry being configured to determine information about the encoder phase of the first and second optical signals by measuring the interference at the interference unit. The processing circuitry may be coupled to detectors to receive the results of an interference measurement from the interference unit.

In an embodiment the interference unit is configured to perform first order interference of said first and second optical signals. The first node, second node and detector node may be configured to implement quantum communication using twin field quantum key distribution "TF-QKD". However, other protocols could also be supported.

In an embodiment, the emitter may be configured to output signals at n different wavelengths, where n is an integer of at least 2, such that there are n different wavelengths in the first optical signal and n different wavelengths in the second optical signal. Thus, the optical system allows many quantum channels to operate in parallel, each channel having its own frequency.

In the above optical system, the emitter may be configured to output a reference signal. In one embodiment, the reference signal is a CW signal as this allows the most information about the quantum system to be transmitted by the reference signal.

The reference signal may have a different wavelength to the encoded first optical signal and the encoded second optical signal. This allows the reference signal to be sent in parallel with the encoded signals. However, it is possible to send the reference signal at the same frequency as the encoded pulses and time multiplex the reference signal with the encoded pulses.

In an embodiment, the detector node is configured to interfere the reference signal at the interference unit and obtain tuning parameters for said optical system. The detector node may then further comprise a control unit which receives said tuning parameters as an input, said control unit being configured to tune said optical system to remove phase drift. The control unit is configured to tune said optical system using at least one of active stabilisation and passive stabilisation. During active stabilisation, the control unit is configured to control a fibre stretcher or phase modulator to accommodate for phase drift between the first and second optical paths. For passive control, the control unit is configured to modify the results of the interference measurement, for example to remove results or to reverse results depending on the phase drift determined from the reference signal. The stabilisation allows for compensation for phase drift between the whole of the first path and the whole of the second path.

In a further embodiment, a method of optical communication is provided, the method comprising:
  outputting a first optical signal from an emitter along a first optical path to an interference unit and outputting a second optical signal from the same emitter along a second optical path to an interference unit; and
interfering the first and second optical signals at the interference unit,
wherein the coherence length of the optical signal is longer than the path difference between first and second optical paths, and there is a path difference between the first and second paths of at least 1 km.

Figure 1:
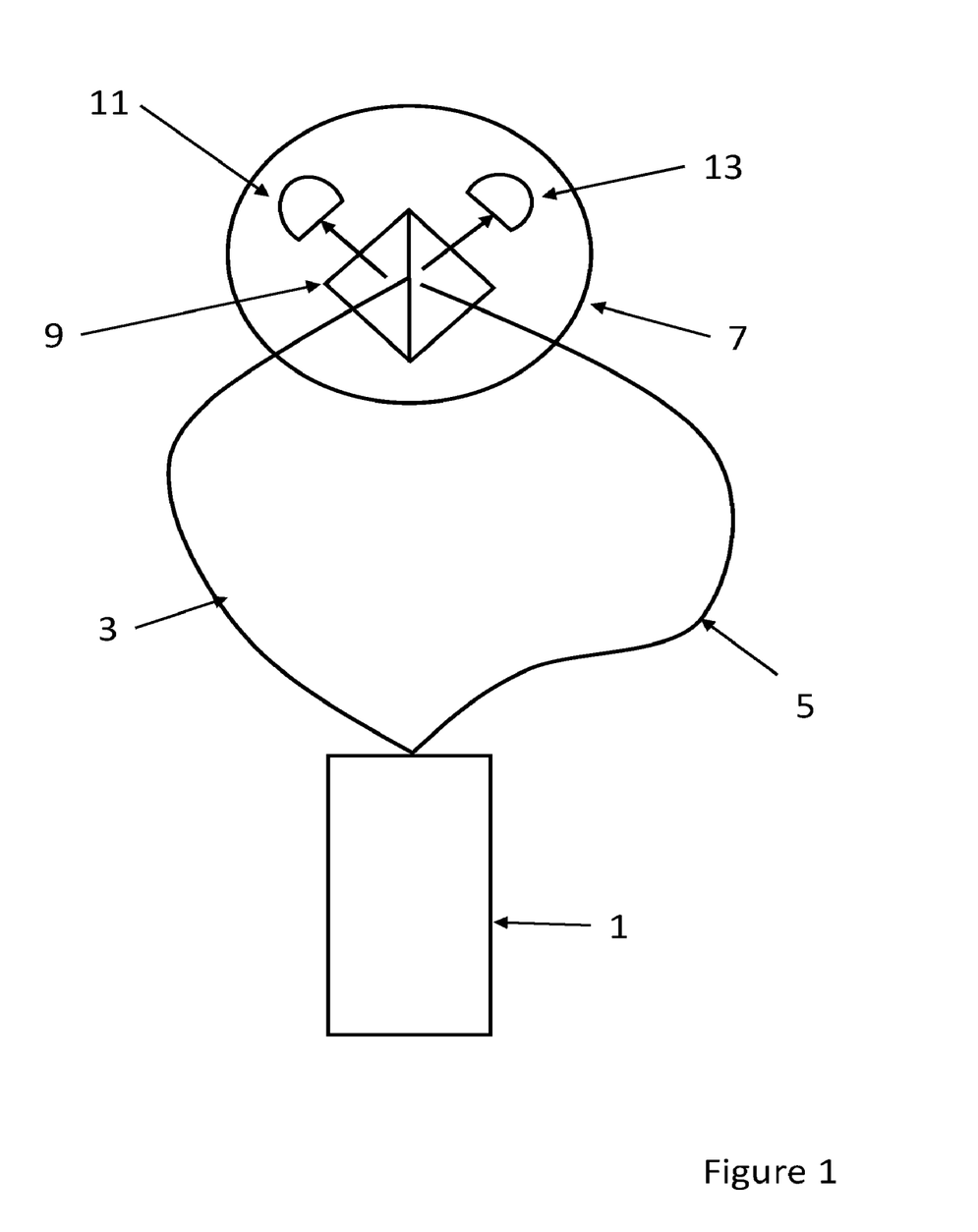
FIG. 1 is a schematic of an optical system in accordance with an embodiment.

FIG. 1 is a schematic of a simplified optical network. The optical network comprises an emitter 1 which is a laser with a coherence length which fulfils the requirements that will be described later. The output of the emitter 1 is divided into a first and second optical signal and the first optical signal passes along a first optical path 3 and the second optical signal passes along second optical path 5. The first optical path 3 and the second optical path terminate at detector node 7. Detector node comprises a first interference unit 9 that interferes the first optical signal and the second optical signal.

The first 3 and second 5 optical paths can be provided by optical fibres. However, the first and second optical paths could also be free space paths or paths that are partially free space.

The output of the interference unit 9 is directed into either detector 11 or 13 dependent on the phase relationship between the first and second optical signals. The detectors 11 and 13 will be described later in detail along with the first interference unit.

The emitter 1 will have a coherence length. The coherence length of a laser is a quantity that indicates the maximum distance that its optical output can travel while still maintaining coherence with the latest optical output emitted by the same laser. Therefore, to be able to obtain information about the first and second optical signals when they left the emitter, from interference measured at the interference unit, the difference in length between the first optical path 3 and the second optical path 5 must be less than the coherence length of the emitter 1.

Figure 2:
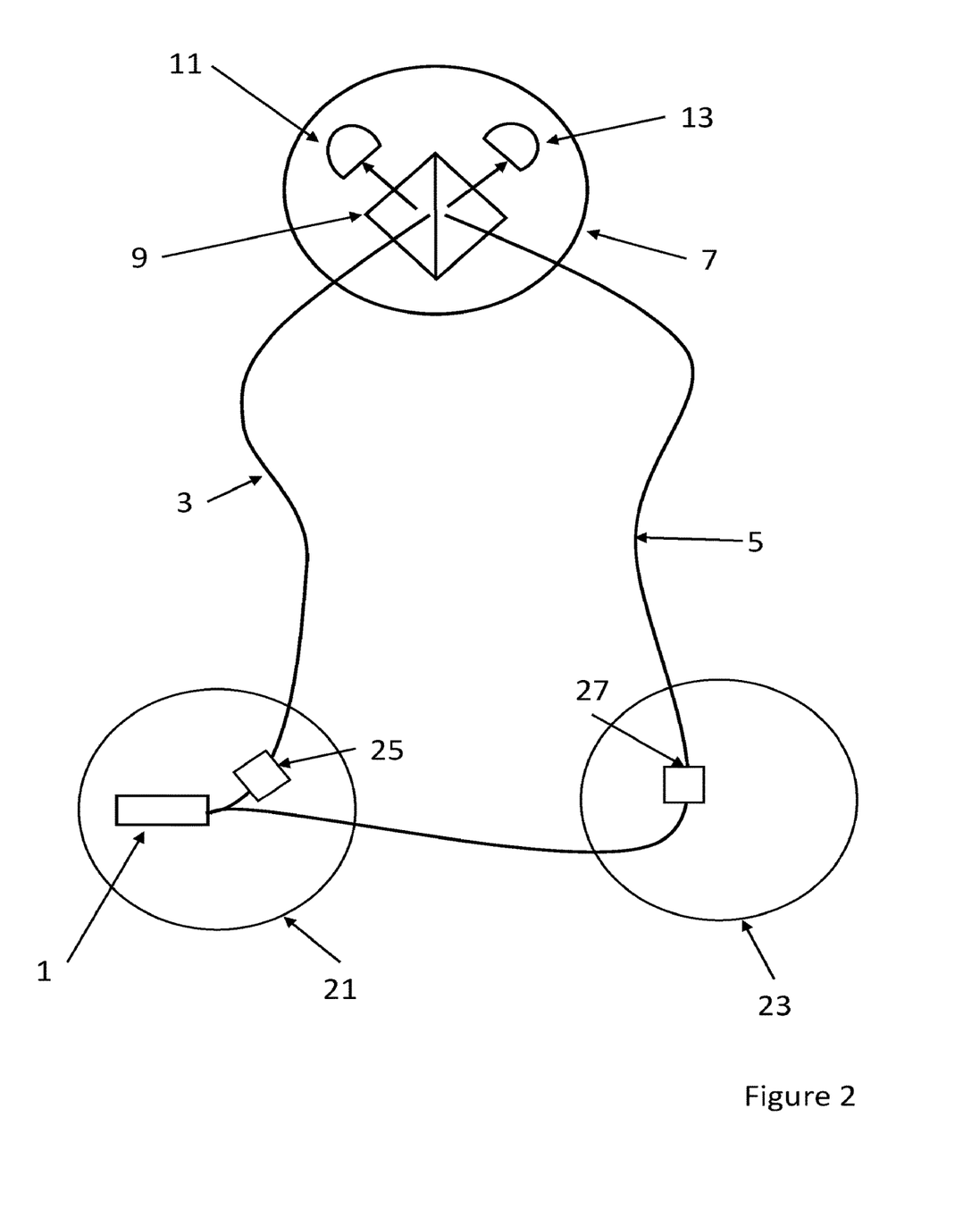
FIG. 2 is a schematic of an optical system in accordance with an embodiment configured as a quantum communication system.

FIG. 2 shows a variation of the system of FIG. 1 which is applied to a simplified quantum communication system. To avoid unnecessary repetition, like reference numerals will be used to demote like features.

The system comprises a first communication node 21 and a second communication node 23. In practice, the system of FIG. 2 can be used to share a quantum key between the first communication node 21 and the second communication node 23.

The emitter outputs an optical signal that forms said first optical signal along said first optical path 3 and the second optical signal that passes through the second optical path. Provided in said first optical path 3 and within said first communication node 21 is an encoding unit 25. The encoding unit 25 is a phase encoding unit that encodes the optical signal from the emitter 1 with a randomly varying phase. The optical signal may be a pulsed signal or a continuous wave (CW) signal. In the case of a CW signal, the signal is carved or chopped into pulses. This may be performed in the encoder 21 or prior to encoding.

The second optical path 5 passes through the second node 23. The second node 23 comprises a second encoding unit 27 and the second optical path 5 passes through said second encoding unit 27. The second encoding unit 27 is also a phase encoding unit that encoder the second optical signal with a randomly varying phase. The optical signal in the second path may be a pulsed signal or a continuous wave (CW) signal. In the case of a CW signal, the signal is carved or chopped into pulses. This may be performed in the second encoding unit 27 or prior to encoding. In an embodiment, the second optical signal is a CW signal when it travels from the emitter to the second node. The signal is then carved or chopped at the second node 23.

In an embodiment, the key is shared between the first and second communication nodes 21, 23 which will be referred to as Alice 21 and Bob 23 according to a TF-QKD scheme. In a Twin field QKD (TF-QKD) scheme information is encoded in the electromagnetic phase of an optical field.

It is desired for Alice 21 and Bob 23 to exchange a key. Alice 21 and Bob 23 transmit to detector node 7 which is a quantum receiver. The two optical transmitters Alice 21 and Bob 23 send light pulses to a detector node 7, usually called "Charlie", which optically couples and measure them. In the arrangement of FIG. 2, the emitter of both Alice's signals and Bob's signals is provided in Alice's node 21. Alice then transmits signals from her node 21 to the detector node 7 and Bob receives the second optical signal from Alice and encodes this signal to produce his signal to transmit to the detector node 7.

Alice 21 and Bob 23 can distil a secret key from the publicly announced results of Charlie's counts. In TF-QKD the users Alice 21 and Bob 23 are both configured as optical transmitters, therefore the security is not threatened by the vulnerabilities of the optical receiver. Protecting optical transmitters is far easier than protecting optical receivers. In the former case, the optical pulses are prepared locally by a trusted user, whereas in the latter they are received from the outside, prepared by someone who is untrusted and possibly interested in breaking the security of the system. It is worth noting that if Charlie 7 is evil and does not comply with the correct execution of the TF-QKD protocol, the two honest users Alice 21 and Bob 23 can always detect his attempt at cheating with very high probability by the laws of quantum mechanics.

In this simplified scenario, a common fixed phase reference $\varphi_R$ is available to all the users all the time. As the phase reference is common to everybody and constant, it can be assumed without loss of generality that $\varphi_R=0$. Alice 21 has a phase locked light source 1 and a phase modulator in her first encoding unit 25. The phase locked light source 1 generates optical pulses with constant phase, and outputs them to the encoding unit 25.

Bob's node 23 is configured in a similar manner to Alice's 21. However, Bob receives the second optical signal from Alice and encodes this signal.

In an embodiment, Alice 21 prepares a first light pulse using her emitter 1 to produce a pulse and then encodes her secret information in the electromagnetic phase difference between the light pulse and the phase reference $\varphi_R$ using encoding unit. In this particular example, the encoding of the BB84 protocol [C. H. Bennett and G. Brassard, *Proc. of IEEE Int. Conf. on Comp. Sys. Sign. Process.* (IEEE, New York, 1984), pp. 175-179] is considered, where Alice encodes a random "basis", either Z or X, by selecting a phase value $\alpha_A=0$ or $\alpha_A=\pi/2$, respectively, and a random "bit", either 0 or 1, by selecting a phase value $\beta_A=0$ or $\beta_A=\pi$, respectively.

The optical pulse prepared by Alice will then carry a total electromagnetic phase $\alpha_A+\beta_A$. Then Alice moves to the next pulse and repeats the procedure. Bob performs similar steps with phases $\alpha_B$ and $\beta_B$ on the pulses received via the second optical path 5 from Alice 21. The total electromagnetic phases of the pulses exiting Alice 21 and Bob's 23 nodes are indicated by $\varphi_A$ and $\varphi_B$ respectively:

$$\text{Alice: } \varphi_A = \alpha_A + \beta_A \quad (1)$$

$$\text{Bob: } \varphi_B = \alpha_B + \beta_B \quad (2)$$

Since all the phases are stable, Alice 21 and Bob's 23 phase values remain constant during the propagation through the communication channels. When the optical pulses reach Charlie's non-polarising beam splitter, they undergo a so-called "1$^{st}$-order interference", which is of the same kind as the one seen in a double-slit interference experiment and in standard QKD. This means that in order to interfere deterministically, the phases of Alice and Bob's pulses should satisfy the following interference condition:

$$\varphi_B - \varphi_A = 0 \mod \pi, \quad (3)$$

where "mod $\pi$" means "addition modulo $\pi$". As the phase values associated to the bits are either 0 or $\pi$, Eq. (3) reduces in this case to the following condition about the matching condition of the bases:

$$\alpha_B - \alpha_A = 0. \quad (4)$$

If this condition is satisfied, then when $$\beta_B - \beta_A = 0, \quad (5)$$

the light emerges from the port connected to one of the detectors 11 or 13, whereas when $$\beta_B - \beta_A = \pi, \quad (6)$$

the light emerges from the port connected to the other of detectors 11 and 13. Therefore, after Charlie announces his counts and after Alice and Bob announce their bases, Alice and Bob can reconstruct the bit value prepared by the other user in all cases where the bases match. In case of non-matching bases, the users discard the data, as in the standard BB84 protocol. In an embodiment, Charlie announces all the instances where exactly 1 of his detectors clicked. For these instances he also announces which detector clicked.

Another possibility is that Charlie announces also when both his detectors clicked. These double clicks are useless for the final key and can be treated in two ways:
1) Alice and Bob discard the runs where Charlie announced the double clicks;
2) Alice and Bob transform a double click into a single click by deciding at random which of Charlie's detectors clicked.

The security is the same in both cases. In an example detectors 11 and 13 are single photon detectors.

According to an example, detectors 11 and 13 are superconducting nanowire single photon detectors (SNSPDs). According to a further example, the SNSPDs are Single Quantum EOS 410 CS cooled at 2.9 K.

However, to allow the interference to carry useful information about the encoding of the pulses, the path difference between the first optical path 3 and the second optical path 5 must be less than the coherence length of the emitter 1. This requirement has tended to mean that quantum communication systems which have a three node arrangement have a symmetrical arrangement where the length of the first optical path and the length of the second optical path are balanced.

However, if an emitter with a long coherence length is used, for example, comprising a laser locked to a high finesse cavity, then path mismatches of 1 km or more can be tolerated. This allows the emitter 1 to be provided in one of the first or second communication nodes 21, 23 which simplifies the whole design of the system.

The above discussion has concentrated on encoding pulses. However, it is also possible for an additional optical signal to be sent that is not encoded to be used as a reference signal. This reference signal can be sent as a CW signal or as a pulsed signal.

Figure 3:
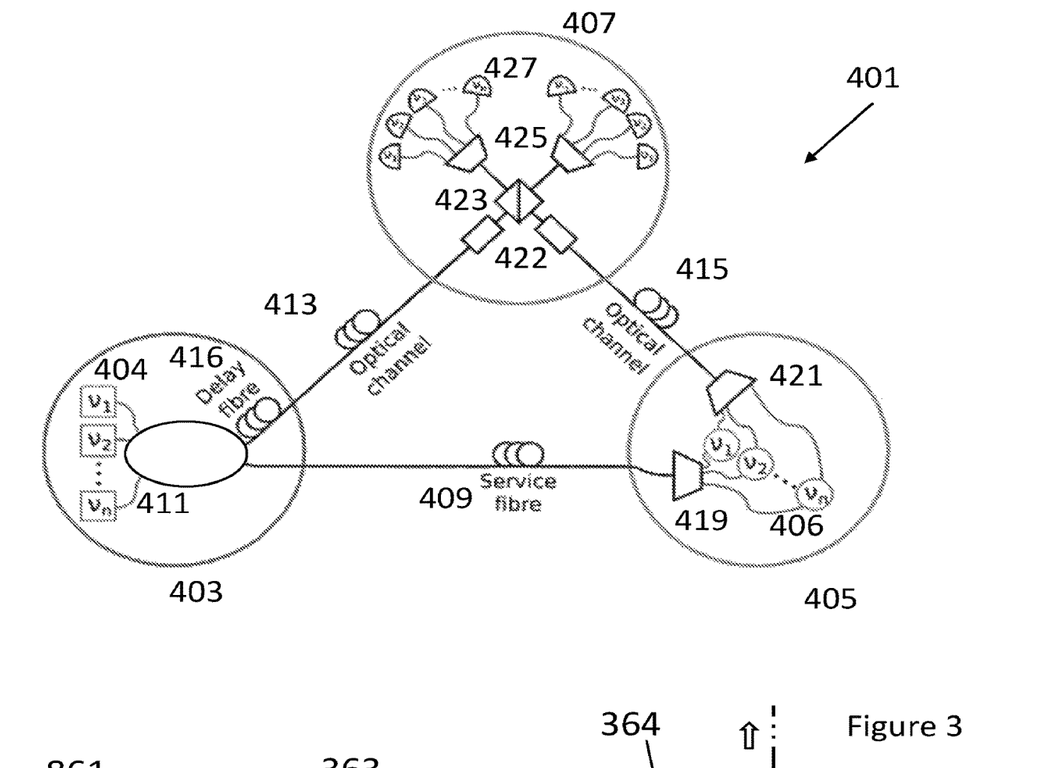
FIG. 3 is a schematic of an optical system in accordance with an embodiment with a reference signal.

FIG. 3 shows a further quantum communication system in accordance with an embodiment.

FIG. 3 shows an asymmetric quantum system in accordance with an embodiment with signal and reference pulses. Similarly to the system described in relation to FIG. 2 above, system 401 comprises three communication nodes—two transmitting nodes 'Alice' and 'Bob' and a single receiving node 'Charlie'. However, only one of the transmitting nodes Alice and Bob comprises an emitter.

The quantum system 401 of FIG. 3 comprises a first communication node 403 and a second communication node 405. As it can be seen from the Figure, the first and the second communication nodes comprise different components. The system 401 also comprises a third detector node 407.

The detector node 407 is shown to be provided in a central location in relation to the two transmitting nodes 403 and 405, however, it should be understood that the position of the detector node 407 may not be central. In particular, the detector node 407 may be provided in closer proximity to one of the communication nodes 403 and hence further away from the other communication node 405.

The first communication node 403 is communicatively coupled to the detector node through a first optical channel 413, and the second transmitting node 405 is communicatively coupled to the receiving node through second optical channel 415. In an embodiment, the first and second optical channels 413 and 415 are optical fibres. Furthermore, as it is shown in the FIG. 3, the path length of the first optical channel 413 is longer than the path length of the second optical channel 415. However, it should be noted that in FIG. 3, the first optical path comprises the first optical channel 413 and the second optical path comprises the service fibre 409 and the second optical channel 415. The first optical path and the second optical path also have different path lengths.

The system 401, also comprises a service fibre 409 which is provided between the first communication node 403 and the second communication node 405, and allows an optical signal to be communicated from the first communication node 403 to the second communication node 405. According to an embodiment, the service fibre 409 may be a standard optical fibre and does not need to have special properties such as frequency stabilisation. However, in an alternative embodiment, the service fibre may be a frequency stabilised service fibre 509, FIG. 5. The function of the service fibre 409 will be described further below.

In this embodiment, the first communication node 403 comprises a plurality of optical sources 404 which are configured to generate light signals at frequencies $v_1$, $v_2$, ..., $v_n$. However, it should be understood that the first communication node 403 may also comprise a single optical source 404. In this embodiment, each of the light sources 404 are coherent light sources with coherence length longer than the path mismatch between the first optical path and the second optical path.

Here, the first optical path comprises the first optical channel 413 including the delay fibre 416. The second optical path comprises the service fibre 409 and the second optical channel 415. The optical sources 404 are configured to generate a plurality of optical pulses. The optical signals might be in a fixed wavelength and/or phase relationship with one another's wavelength and/or phase. Alternatively, the optical light sources 404 might be independent light sources and the generated light signals may not be in a fixed wavelength and/or phase relationship with one another.

Figure 4:
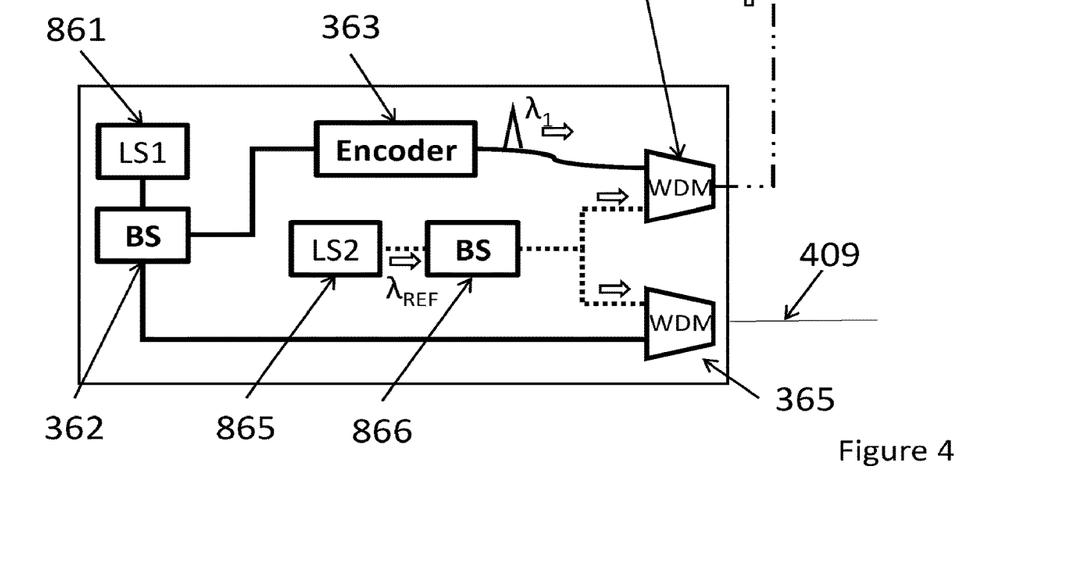
FIG. 4 is a schematic of a communication node suitable for use in the system of FIG. 3.

In FIG. 3, the encoding unit (25 of FIG. 2) is not shown for clarity to show the main components of the overall system. However, FIG. 4 shows a possible arrangement of the first communication unit with an encoder. Optical component 411 of FIG. 3 represents the beam splitters, wavelength division multiplexers and encoders of FIG. 4.

In the system of FIG. 4, there are two emitters, signal emitter LS1 861 which emits optical radiation having a first wavelength. In this example, LS1 outputs CW radiation which is later converted into pulsed radiation. The output of signal emitter LS1 861 is split by beamsplitter 362 which splits the optical signal into a first optical signal and a second optical signal and directs the first optical signal through encoder 363 and to first wavelength division multiplexer 364. The second optical signal is directed from beam splitter 362 towards second wavelength division multiplexer 365.

The first wavelength division multiplexer is provided in the first optical path and the second wavelength division multiplexer is provided in the second optical path.

Figure 5:
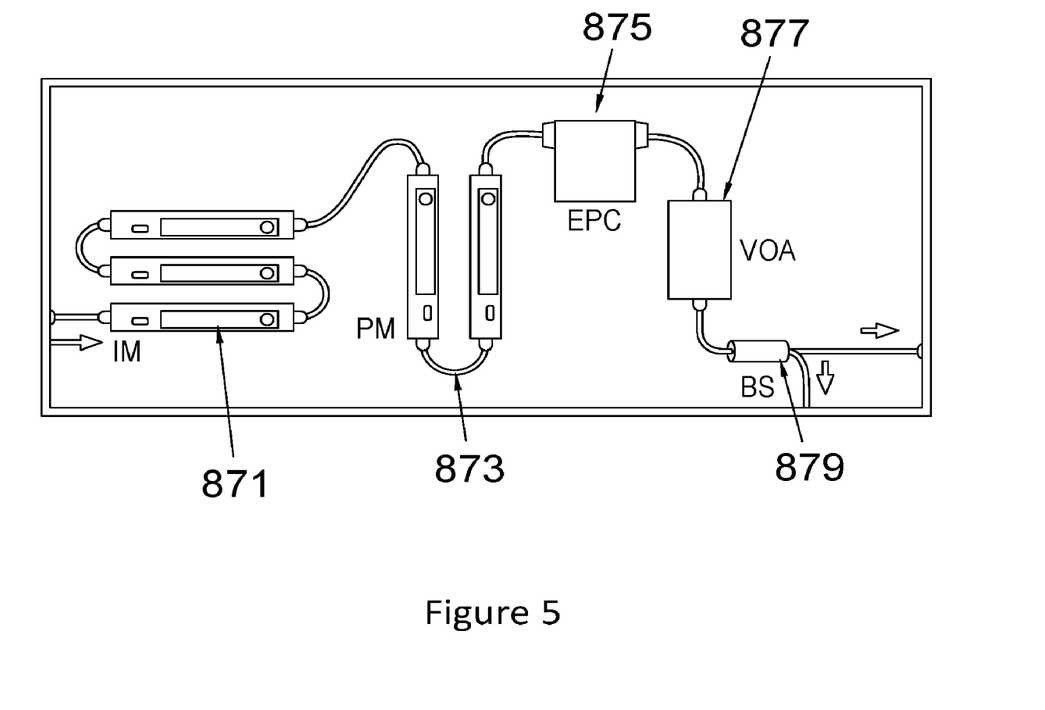
FIG. 5 is a schematic of an encoding unit suitable for use in the system of FIG. 4.

A possible implementation of the encoder is shown in FIG. 5. The incoming CW light arrives already aligned in polarisation with the optical axes of the subsequent modulators 871. The first components in the encoders are three intensity modulators (IMs) 871, used to carve 250 ps long pulses at a 1 GHz rate, with three possible intensity levels (u, v, w) to allow the use of so-called decoy state protocols. The intensity ratios between the different intensity levels can be adjusted by the AC amplitude driving the IMs.

Two phase modulators (PMs) 873 are then used to encode the phase of the optical pulses. In this system, two PMs are cascaded instead of using just one to reduce their RF signal amplitudes. By limiting each PM to a modulation range of $[-\pi/2, \pi/2]$ it is possible to achieve a phase modulation that covers the whole $[0, 2\pi)$ range and that is linear with its driving signals amplitude. Each PM is driven by a 8-bit DACs, and with two cascaded we are able to encode 512 different phase values over the $2\pi$ phase range.

All the modulators are driven by two synchronised 12 GSa/s waveform generators, one for each user, programmed to encode a 25040-pulse long pseudo-random pattern.

The PMs are followed by an electrically driven polarisation controller (EPC) 875, a variable optical attenuator (VOA) 877, and a 99:1 beam splitter (BS) 879. The EPC is used to control the polarisation of the $\lambda_1$ photons after transmission through the channel. Each user has a continuous polarisation optimisation routine that aligns the quantum signals along the preferred optical axis at Charlie.

The VOA sets the flux of the quantum signal before injection into the quantum channel, through a flux calibration control loop that continuously adjusts the VOA so as to have a stable optical output, monitored at the strong output of the BS.

In the first communication unit of FIG. 4, there is a second emitter LS2 865 which will be referred to as a reference emitter. The output of this reference emitter 865 is split by beam splitter 866 and one part of the beam is directed towards to first wavelength division multiplexer 364 where it is multiplexed with the encoded optical signal. The other part of reference signal from beam splitter 866 is directed towards second wavelength division multiplexer 365 where it is multiplexed with the optical signal which has not been encoded to be sent along service fibre. In this embodiment, the reference signal and the second part of the optical signal that are sent to second wavelength division multiplexer 365 are CW signals which are passed to the second transmitting node.

The first optical signal is transmitted to the receiving node through the first optical channel 413, while the second component is transmitted to the second transmitting node 405 through the service fibre 409. The service fibre 409 may comprise one or more wavelength amplifiers, such as Erbium-doped fibre amplifier EDFAs, which may be configured to optically amplify the optical signal. However, in an embodiment, the service fibre 409 does not include any frequency stabilisation that allows it to compensate for changes to the frequency as the signal passes along the fibre.

FIG. 4 shows two emitters, one signal emitter and one reference emitter. However, it is possible for the first communication node to comprise a plurality of signal emitters, each of them operating at a different frequency and each of them passing through its own encoder. It is also possible to derive multiple frequencies from the same emitter.

In this embodiment of the system, the second communication node 405 does not comprise any light source. Instead, the second communication node 405 is configured to receive the optical signal from the first communication node 403.

In an embodiment, the second transmitting node comprises an optical wavelength de-multiplexer 419 which de-multiplexes the received optical signals including the reference signals into the individual optical signals so that they can be treated separately.

The different optical signals may be optically manipulated in accordance with the specific application requirements. In an embodiment, each of the signals (with the exception of the reference) is directed through an encoding unit described with reference to FIG. 5.

The optical signals may also be regenerated, examples of optical regeneration techniques include but are not limited to EDFAs, Optical Phase Locking Loop, Optical Injection Locking, Stimulate Raman Scattering, and Stimulated Brillouin Scattering. In an embodiment, the regeneration units 406 may be coherent light regeneration units. The regeneration optical signals allows amplification of the frequency output by the service fibre. This may be achieved by using a local coherent emitter which is configured to output frequency that matches to the output frequency (or frequencies) of the service fibre.

In embodiments, the optical signals may not be optically manipulated or regenerated and can be directly relayed into the optical multiplexer 421 and transmitted to the receiving node through the second optical channel 415.

For simplicity, this is not shown in FIG. 3. However, prior to entering the optical multiplexer 421, the second optical signal (or signals if there are multiple signal frequencies) are each passed through an encoder of the type described with reference to FIG. 5.

In the encoder of FIG. 5, the intensity modulators are used to chop or carve the CW signal into pulses. The intensity modulators in the encoders of the first transmitting node and the second transmitting node are synchronised so that the pulses from the first arrive at the interference unit at the same time.

The detector node 407 is configured to receive the first optical signals from the first communication node 403 and the second optical signals from the second communication node 405. The detector node 407 comprises an interference unit 423 which interferes the two optical signals and the resulting signals are de-multiplexed by optical de-multiplexers 425 to the individual optical signals. The individual optical signals are detected by the optical detectors 427.

The detector node 407 may also comprise stabilisation units 422. The stabilisation units 422 are configured to stabilise the received optical signals from the first transmitting node 403 and the second transmitting node 405, before the optical signals are interfered at the interference unit 423.

The received optical signals may be stabilised using active or passive stabilisation techniques.

Both the signals that travel along the first optical path and the signals that travel along the second optical path will be subjected to phase noise or phase drift in the channels that will affect the ability of the pulses to interfere. To address this, the channels are stabilised. By measuring the interference between the reference signals, it is possible to determine the error between the channels.

In active stabilisation a fibre stretcher, phase modulator or similar device will be provided in one of the optical paths and is used to minimise the phase drift between the channels. In one embodiment, the active stabilisation comprises two stages, a fast stage comprising a phase modulator and a slower stage comprising a fiber stretcher. The two stages can be used together to correct for phase drift. The measurement of phase drift can be determined from the interference results of the reference signals. It is also possible to passively compensate for phase drift. This can be done by post processing the measured signals.

As discussed above, in order to obtain information about the first and second optical signals when they left the emitter, from interference measured at the interference unit, the coherence length of the emitters, either signal emitters or reference emitters must be longer than the path mismatch between the first and second optical paths.

In an embodiment, the first communication node may further comprise a delay fibre 416, as shown in FIG. 3. The delay fibre 416 is provided such that it increases the effective length of the first optical channel and decreases the path mismatch with the combined length of the service fibre and the optical channel, so that the path mismatch is shorter than the coherent length of the optical sources. For example, the effective length of the delay fibre may be equal to the path length of the service fibre. If an ultra-narrow linewidth laser is used a delay fibre 416 is not required.

Figure 6:
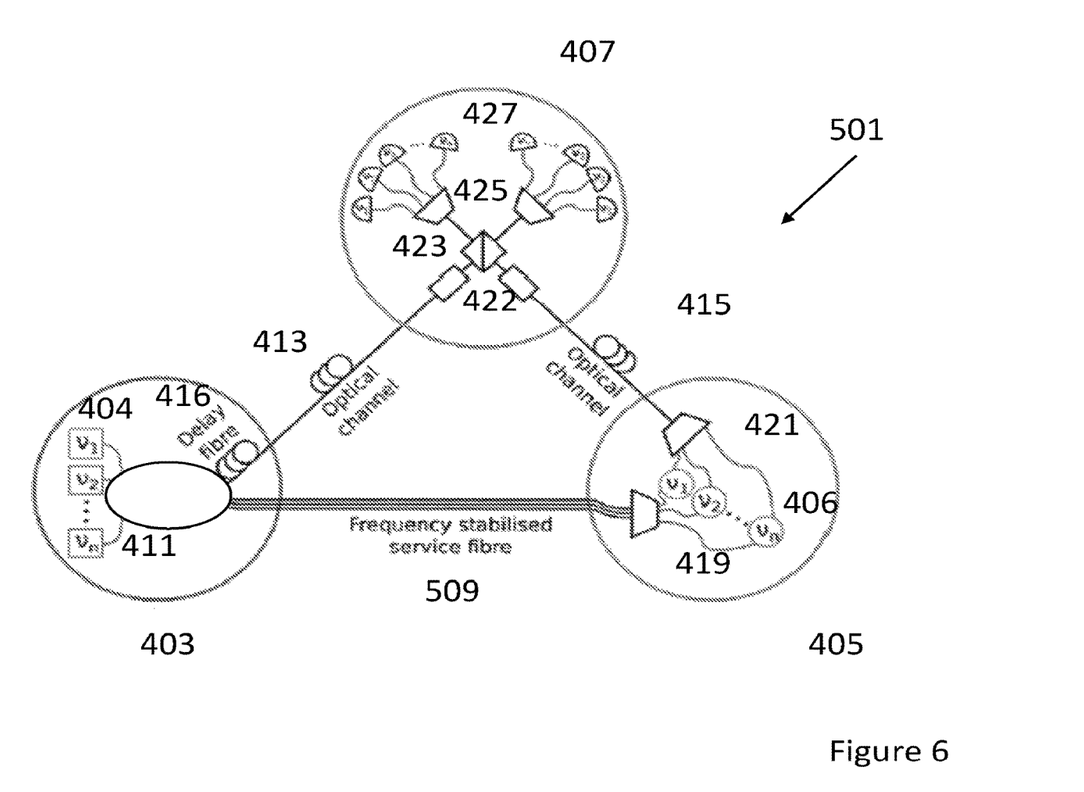
FIG. 6 is a schematic of a system in accordance with a further embodiment.

Although it is not necessary for first and second communication nodes to be connected via a frequency stabilised service fibre, such an arrangement is possible, for example, as shown in FIG. 6.

The embodiment of FIG. 6 is largely identical to that described with reference to FIG. 3. To avoid unnecessary repetition, like reference numerals will be used to denote like features. The node configuration explained with reference to FIG. 4 and the encoder configuration explained with reference to FIG. 5.

The frequency stabilised service fibre does not need to be used. However, it is possible to connect the first and second transmitting nodes 403, 405 with a frequency stabilised fibre. The frequency stabilised fibre is configured to allow recovery of the frequency that was input into the fibre. When radiation passes along a fibre, the phase noise generated in the fibre causes a variation in the frequency of the radiation that exits the fibre compared to the frequency that was input into the fibre. A frequency stabilised fibre actively compensates for the changes in the frequency caused by the fibre by measuring the variation caused by the fibre and providing a correction based on this measurement. The measurement in the variation of frequency can be performed by reflecting the received radiation back from the output to the input of the fibre and measuring the variation using interference. A correction can then be applied using information derived from this measurement. For example, a fast feedback controlling an electro-optic modulator, such as an Acousto-optic Modulator (AOM), or a phase modulator could be used to allow the output frequency of the frequency stabilised fibre to match its input frequency.

Although, the above has been described with reference to QKD and the TF-QKD protocol has been exemplified, the above embodiments have other applications, for example in DLCZ type quantum repeaters and quantum fingerprinting. Applications outside quantum technology are also possible.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An optical system, comprising:
   an emitter configured to output a first optical signal along a first optical path to a detector node and to output a second optical signal along a second optical path to the detector node, the detector node being configured to interfere the first and second optical signals;
   a first node with a first encoder located in the first node, the first node forming at least part of the first optical path, the first encoder being configured to receive said first optical signal and encode said first optical signal in phase such that the first optical signal output from said first encoder is encoded in phase; and
   a second node with a second encoder located in the second node, the second node forming at least part of the second optical path, the second encoder being configured to receive said second optical signal and encode said second optical signal in phase such that the second optical signal output from said second encoder is encoded in phase,
   wherein said detector node is configured to cause interference of the encoded first optical signal and the encoded second optical signal, and
   coherence length of the optical signal is longer than a path difference between the first and second optical paths, and the path difference between the first and second optical paths is at least 1 Kilometer (km).

2. The optical system according to claim 1, wherein the emitter is located in the first node such that the second optical path extends from the emitter in the first node, through the second node and to the detector node.

3. The optical system according to claim 1, wherein the first optical signal and the second optical signal are continuous wave "CW" signals and the first encoder is configured to produce a pulsed signal from said first optical signal and the second encoder is configured to produce a pulsed signal from said second optical signal.

4. The optical system according to claim 3, wherein each pulse is configured to contain on average one photon or less.

5. The optical system according to claim 1, wherein said emitter is configured to output signals at n different wavelengths, where n is an integer of at least 2, such that there are n different wavelengths in the first optical signal and n different wavelengths in the second optical signal.

6. The optical signal according to claim 1, the system being configured as a quantum communication system, said detector node comprising processing circuitry, said processing circuitry being configured to determine information about the encoder phase of the first and second optical signals by measuring the interference at the detector node.

7. The optical signal according to claim 6, wherein the detector node is configured to perform first order interference of said first and second optical signals.

8. The optical system according to claim 7, wherein the first node, the second node and the detector node are configured to implement quantum communication using twin field quantum key distribution.

9. The optical system according to claim 6, wherein the emitter is not located in the detector node.

10. The optical system according to claim 1, wherein the emitter comprises a laser locked to a high finesse optical cavity.

11. The optical system according to claim 6, wherein the emitter is configured to output a reference signal.

12. The optical system according to claim 11, wherein the reference signal is a continuous wave signal.

13. The optical system according to claim 11, wherein the reference signal has a different wavelength to the encoded first optical signal and the encoded second optical signal.

14. The optical system according to claim 11, wherein the detector node is configured to interfere the reference signal and obtain tuning parameters for said optical system.

15. The optical system according to claim 14, wherein the detector node uses said tuning parameters as an input to tune said optical system to remove phase drift.

16. The optical system according to claim 15, wherein the detector node is configured to tune said optical system using at least one of active stabilisation and passive phase stabilisation.

17. The optical system according to claim 1, wherein the first node and the second node are linked by a frequency stabilising fibre.

18. A method of optical communication, the method comprising:
   outputting a first optical signal from an emitter along a first optical path to a detector node and outputting a second optical signal from the same emitter along a second optical path to the detector node, wherein:
   at least part of the first optical path being formed by a first node with a first encoder located in the first node, the first encoder receiving said first optical signal and encoding said first optical signal in phase such that the first optical signal output from said first encoder is encoded in phase; and
   at least part of the second optical path being formed by a second node with a second encoder located in the second node, the second encoder receiving said second optical signal and encoding said second optical signal in phase such that the second optical signal output from said second encoder is encoded in phase,
   wherein said detector node is configured to cause interference of the encoded first optical signal and the encoded second optical signal;
   the method further comprising:
   causing interference of the first and second optical signals at the detector node,
   wherein coherence length of the optical signal is longer than a path difference between the first and second optical paths, and the path difference between the first and second paths is at least 1 kilometer (km).

* * * * *